United States Patent [19]

Hägglund et al.

[11] Patent Number: 4,549,123
[45] Date of Patent: Oct. 22, 1985

[54] METHOD AND AN APPARATUS IN TUNING A PID-REGULATOR

[75] Inventors: Tore Hägglund; Karl J. Åström, both of Lund, Sweden

[73] Assignee: NAF Controls AB, Solna, Sweden

[21] Appl. No.: 478,560

[22] PCT Filed: Aug. 23, 1982

[86] PCT No.: PCT/SE82/00268
§ 371 Date: Mar. 21, 1983
§ 102(e) Date: Mar. 21, 1983

[87] PCT Pub. No.: WO83/00753
PCT Pub. Date: Mar. 3, 1983

[30] Foreign Application Priority Data

Aug. 24, 1981 [SE] Sweden ............................ 81049892

[51] Int. Cl.$^4$ ............................................ G05B 11/42
[52] U.S. Cl. ...................................... 318/610; 364/162
[58] Field of Search .................... 318/610, 561, 609; 364/161-163

[56] References Cited

U.S. PATENT DOCUMENTS

| 2,946,943 | 7/1960 | Nye et al. | 318/610 X |
| 3,938,017 | 2/1976 | Hayes | 318/610 |
| 4,358,821 | 11/1982 | Nieml | 318/610 X |
| 4,390,942 | 6/1983 | Keizer | 319/610 X |
| 4,408,148 | 10/1983 | Herzog | 318/610 |
| 4,415,966 | 11/1983 | Herzog | 318/610 X |
| 4,466,054 | 8/1984 | Shigemasa et al. | 318/610 X |

OTHER PUBLICATIONS

J. H. Ziegler, N. B. Nichols, Optimum Settings for Automatic Controllers, 1942, "Transactions of the American Society of Mechanical Engineers", New York, pp. 759, 768.
Grabbe, Ramo, Wooldridge, "Handbook of Automation, Computation and Control," vol. 3, published 1961, by John Wiley & Sons Inc., Adjustment of the Controller Actions, pp. 10/20-10/27.

Primary Examiner—B. Dobeck
Attorney, Agent, or Firm—James E. Nilles; James R. Custin

[57] ABSTRACT

In tuning a regulator (2) of the PID-type of a process (1) in a feed back system where the process and the regulator has a transfer function G(s) in common, a method is proposed for bringing the system into self oscillation for measuring the amplitude and frequency of the oscillation and tuning the regulator in dependence of the measurements obtained. A circuit function (NL) having non-linear characteristic and a describing function N(A) is introduced into the system in series to the process for acting on the regulator signal (e). Self oscillation is obtained if $G(i\omega)\cdot N(A) = -1$ for at least one value of the angular frequency $\omega$ and the amplitude A of the regulator signal (e). An apparatus for performing the method is disclosed.

8 Claims, 6 Drawing Figures

METHOD AND AN APPARATUS IN TUNING A PID-REGULATOR

TECHNICAL FIELD

The present invention relates to the tuning of a regulator of the PID-type for a process and more exactly defines a method and an apparatus for bringing—as a step in the method of tuning the regulator—the process into a controlled self oscillation for determining quantities which are essential for the tuning of the regulator. The invention includes all variations and combinations (P, PI, PD, PID etc) of the control functions of a PID-regulator.

BACKGROUND ART

The PID-regulator is very common for the control of industrial processes and provides for proportional, integrating and derivative control. A process of larger scope employs a large number of such regulators. PID-regulators are manufactured in large series as standard products. It is more and more common that the regulators are based on microcomputers, and then more complicated control functions can be used.

Even if the regulator is based on a microcomputer the principal structure of a conventional PID-regulator is maintained since persons in the industry skilled in the art have a long and experienced knowledge about and a feeling for the tuning of such PID-regulators.

There are well established methods, e.g. the method of Ziegler and Nichols, for the manual tuning of a PID-regulator in dependence upon the parameters of the process. In spite of this many regulators in industrial processes are badly tuned in practise. This is due on one hand to the fact that the manual tuning which comprises manually changing the regulator amplification is tedious, on the other hand to the fact that the parameters/properties of the process change over the course of time.

There is also equipment for automatic tuning of PID-regulators but such equipment is expensive and not quite simple to use. Moreover, there are adaptive regulators but such regulators are much more complicated than a simple PID-regulator and have not yet been used on a large scale.

Thus, there is a need for a simple method of automatic tuning of a PID-regulator which method results in a non-expensive regulator. The method should be so simple that it can be applied on PID-regulators realized by means of a microcomputer only by making a simple change of, or a minor addition to the program of the regulator.

The purpose of the invention is to facilitate a simple method of tuning a PID-regulator and as a step thereof to provide a method and an apparatus for bringing the system including the PID-regulator into controlled self oscillation. When the system oscillates, quantities of the process which are essential for the tuning can be measured.

This purpose is achieved by means of a method where the process and the regulator in common have a transfer function G(s) in a feed-back system and the system is brought into controlled self oscillation for measuring the amplitude and the frequency of said oscillation whereupon the regulator is tuned in dependence upon the values measured for the amplitude and the frequency of said oscillation. In accordance with the invention the signal fed to the regulator is subjected to the effect of a circuit function (NL) having a non-linear characteristic and having a describing function N(A). A relation $G(i\omega) \cdot N(A) = -1$ is valid for at least one value of the angular frequency and the amplitude A of said signal.

The method facilitates simple automation of the tuning of PID-regulators, particularly regulators based on a microcomputer.

BRIEF DESCRIPTION OF THE DRAWINGS

The invention is described in greater detail below and with reference to the adjoining drawings.

MODE FOR CARRYING OUT THE INVENTION AND INDUSTRIAL APPLICABILITY

The following description of the invention includes all variations and combinations of the control functions of a PID-regulator. For instance the derivative control function of a regulator can be omitted and only the P- and I-control functions be used.

Figure 1:
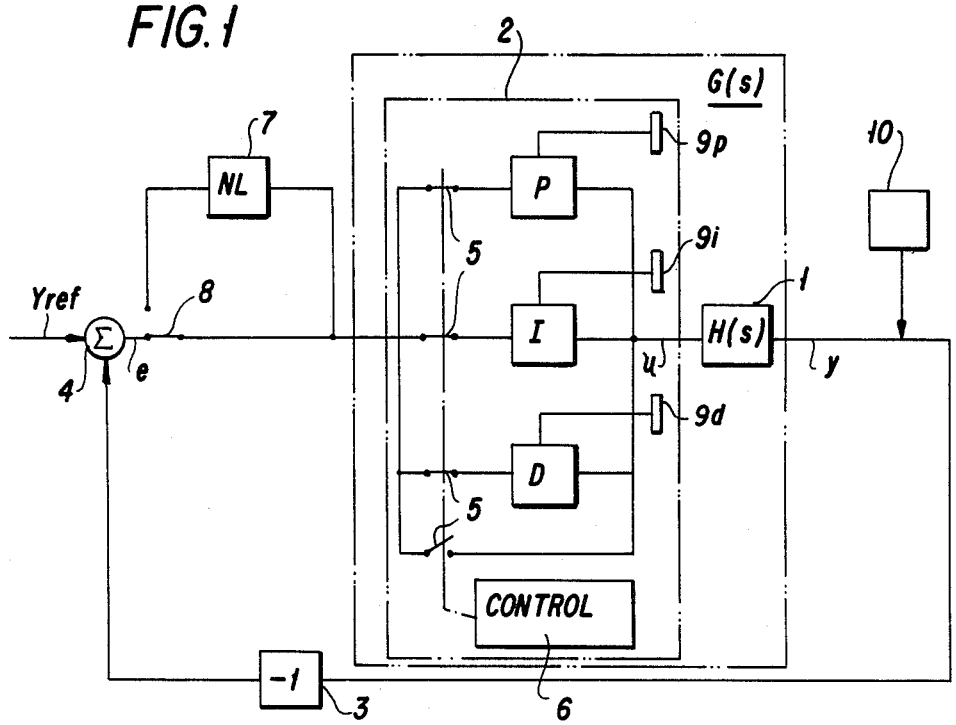
FIG. 1 is a block diagram of one embodiment illustrating the control members of a PID-regulator as seperate units.

First a prior art system is described for facilitating understanding of the invention. In FIG. 1 a block diagram shows a prior art system based upon analog technique and provided with an apparatus of the invention for bringing the system into self oscillation.

A process 1 illustrated by means of its transfer function H(s) is controlled by means of a PID-regulator 2 in respect of a process variable. The actual value y of the variable is obtained on an output from the process 1 and is fed back over a negative feed-back loop 3 to a summing junction 4 and there is combined with a reference value $y_{ref}$ for generating an error signal e which is supplied to the regulator 2.

Generally the following relationship holds between the error signal e and the control signal u of the regulator:

$$u = k \left( e + \frac{1}{T_I} \right) \int e(t) \, dt + T_D \cdot \frac{de}{dt} ,$$

where k, $T_I$, and $T_D$ are constants.

The regulator 2 is shown to include separate control function units P, I and D for analog control but can as shown below, also be built up by means of a microcomputer. Moreover, switches 5 are shown for the connection/disconnection of the P-, I-, and D-control functions as well as by pass. The switches 5 are individually controlled by means of a suitable control unit 6.

The transfer function of the regulator 2 combined with the process 1 is designated G(s).

For tuning the regulator by means of the prior art method of Ziegler and Nichols the system is brought into controlled self oscillation in that, at the same time as the integrating and derivative units (I and D) of the regulator are disconnected the amplification of the proportional control unit P is increased up to self oscillation by manually moving an adjusting means 9p. Maintaining the system in this state, the amplitude and frequency of the self oscillation are determined by measuring the system output signal y. The quantity values resulting from said measuring are used for calculating the parameters k, $T_I$ and $T_D$ which are adjusted by means of the adjusting means 9p, 9i and 9d of the control function units P-, I- and D, respectively. The parameters of the PID-regulator 2 are calculated and fixed according to given formulas in the table below:

| Regulator | Amplification (k) | Integration Time ($T_I$) | Derivative Time ($T_D$) |
|---|---|---|---|
| P | 0,5 $k_c$ | | |
| PI | 0,4 $k_c$ | 0,8 $T_c$ | |
| PID | 0,6 $k_c$ | 0,5 $T_c$ | 0,12 $T_c$ | where $k_c$ is the critical amplification, i.e. the amplification of the system in self oscillation, and $T_c$ is the period of time of the self oscillation. The critical amplification is obtained from the measured quantity values in a known manner.

Figure 2:
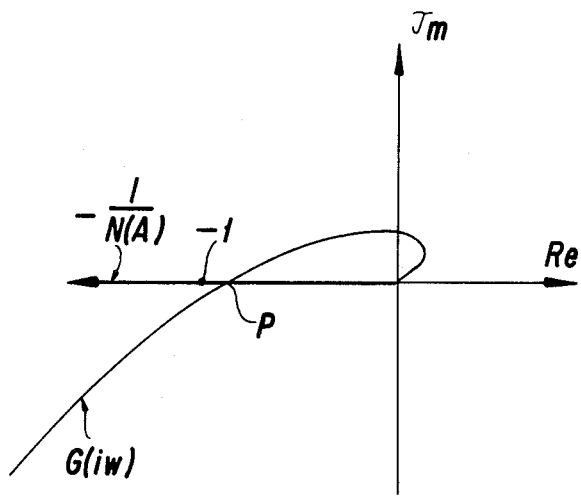
FIG. 2 is a diagram in the complex plane and illustrates the transfer function of a process as a Nyquist curve, and shows the negative inverse of the so called describing function of a non-linear circuit function having an ideal relay characteristic.

The method of Ziegler and Nichols for the tuning of a PID-regulator is a thumb rule based upon parameters of the Nyquist curve in the complex plane, when this curve passes through the point (−1;0). According to the Nyquist theorem a process is stable if the Nyquist curve does not encircle the point (−1;0). The diagram of FIG. 2 illustrates a Nyquist curve G(iω) for positive values of the angular frequency ω.

In order to secure that the self oscillation occurs irrespective of small non-linearities, as a dead zone and/or hysteresis, of the system the input signal $y_{ref}$ can be subjected to a small disturbance.

So far the feed-back system and the tuning method as described are previously known.

Instead of the above mentioned method for determining the amplitude and the frequency of the self oscillation, there is according to the invention introduced in series to and before the process 1 a non-linear circuit 7 which has a describing function N(A) defined below. Thus, a non-linear circuit function NL is introduced into the signal path of the regulator 2 for processing the error signal e before this signal is supplied to the process 1. This is illustrated in FIG. 1 by means of a switch 8 which connects the circuit 7.

Said non-linear circuit function NL has a relay characteristic which means that the output from the circuit 7 has a first low value when the input e of the circuit is below a predetermined value and has a second high value when the input signal exceeds said predetermined value. Thus, the output signal oscillates between two values, e.g. the amplitudes +d and −d. Such a circuit can be realized by means of a simple comparator having a large internal amplification.

Although an ideal relay characteristic, i.e. right angled transitions, is preferred and is easily realized in a PID-regulator based on a microcomputer, the invention operates also for less well defined relay characteristics having a slope and/or overshoots.

A non-linear circuit function can be represented by a describing function N(A), which is defined as the transfer function of the circuit function when the input signal is a sine signal A sin (ωt), where A is the amplitude, ω the angular frequency and t the time.

For bringing the system of FIG. 1 with the non-linear circuit function NL introduced therein into self oscillation the following equation shall be valid for at least one value of the parameters A and ω:

$$G(i\omega) \cdot N(A) = -1$$

or $$G(i\omega) = -\frac{1}{N(A)}$$

In the diagram of FIG. 2 the two functions G(iω) and −1/N(A) are drawn in the complex plane. The amplitude and frequency of the self oscillation are obtained from the parameter values in the crossing point p of the depicted curves. By determining the amplitude and frequency of the self oscillation the value of the transfer function G(iω) of the control system (including the PID-regulator) in the actual crossing point p can be determined and this information can then be used for tuning the regulator.

A non-linear circuit function NL having an ideal relay characteristic has a describing function N(A) =4d/πA where A is the amplitude of the circuit function input signal e, and d is the amplitude of the output signal. The negative inverse −1/N(A) of the describing function becomes, drawn in the complex plane a straight line which coincides with the negative real axis −Re.

In a non-linear circuit having a relay characteristic the Ziegler and Nichols method is well suited for tuning a PID-regulator. When the non-linear circuit 7 with the relay characteristic is connected and the PID-regulator is entirely disconnected, i.e. by-passed, the system is brought into self oscillation. Possibly the proportional unit P of the regulator can be connected for limiting the amplitude of the oscillation. The amplitude A of the self oscillation, being a measure of the crossing point p of the transfer function G (iω) with the negative real axis −Re, is determined by measuring the signal y after the process by means of the measuring unit 10. With a knowledge of this point, i.e. the amplitude A, and the relay characteristics (the value d) of the non-linear circuit, the critical amplification $k_c$ of the system can be calculated in accordance with the equation $k_c = 4d/\pi A$. Moreover, the period time $T_c$ of the self oscillation is determined by measurement.

According to the formulas of Ziegler and Nichols the amplification, integration time and derivation time are thereafter calculated, and then the regulator is tuned in dependence of said calculated parameters.

In this connection it should be mentioned that not only the P-unit can be connected in the course of the oscillation and measuring. Also the I- and D-units can be connected individually or in combination—also with the P-unit. This is particularly so if another point on the Nyquist curve than the crossing point with the negative real axis is to be identified. Reference is made to "Ziegler Nichols Auto-Tuners" by Karl Johan Åström, Department of Automatic Control, Lund Institute of Technology, May 1982.

The above method can be performed manually or automatically in dependence of how the regulator 2 and the non-linear circuit function NL is implemented.

The invention obviates the problem caused by small non-linearities in the system which may obstruct self oscillation, since the introduced non-linear circuit function NL largely eclipse any small nonlinearity.

Figure 3:
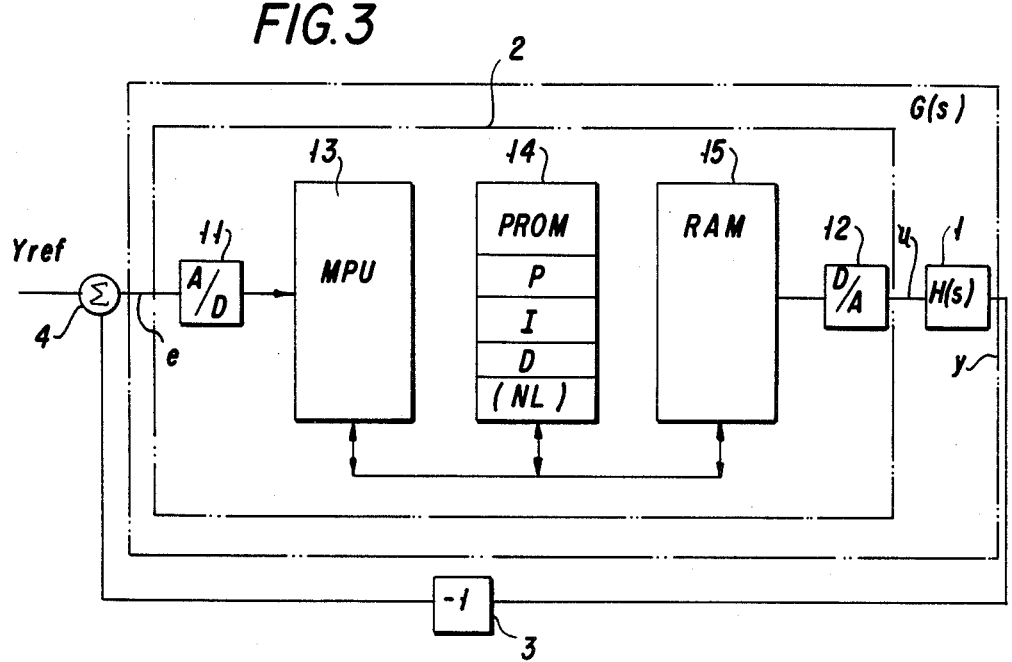
FIG. 3 is a block diagram showing the invention realized by means of a regulator based on a microcomputer.

The PID-regulators of today are usually built on the basis of a microcomputer and FIG. 3 in a block diagram shows the system of FIG. 1 implemented with a regulator comprising a microcomputer. On its input the microcomputer has an A/D-converter 11 and on its output a D/A-converter 12. Moreover, there is a microprocessor 13, a programable read only memory 14 (PROM)-serving as a program storage 14 and a random access memory 15 (RAM) for buffering data. The buffer memory 15 has input and output registers as well as a clock for generating output signals as pulses to the D/A-converter 12. The units 13–15 of the microcomputer are combined to cooperate in a known manner. The control functions for P-, I- and D-regulation are stored in the program memory 14 together with any other soft ware required by the microcomputer for its operation.

The analogously operating control function units shown in FIG. 1 as circuits can be illustrated by means of the circuit functions $k \cdot e$ for the proportional unit P, $k/T_I \cdot \int e\,dt$ for the integrating unit I and $k \cdot T_D (de/dt)$ for the derivative unit D. In the embodiment according to FIG. 3 these circuit functions are stored in the program storage 14 as algorithms for acting upon the regulator input signal or error signal e or more specifically measured values thereof in order to generate at the output of the regulator a control signal u which is supplied to the process. Like the embodiment of FIG. 1 the reference value $y_{ref}$ and the process actual value or measured variable is y.

This known PID-regulator is tuned by means of not shown adjusting means in that only the proportional control is involved, whereupon the amplification is manually increased until self oscillation is obtained. The amplification and the period of oscillation of the self oscillation are measured and used for the calculation and adjustment of the regulator parameters according to the formulas of Ziegler and Nichols.

In order to bring the system into self oscillation for the purpose of determining the amplitude and frequency of the self oscillation there is, in accordance with the invention, introduced a circuit function NL having non-linear characteristic for processing the regulator signal. This circuit function NL is implemented in the microcomputer as a further algorithm and also complies with the previously mentioned requirement for self oscillation. Thus, for its describing function N(A) it holds that $G(i\omega) \cdot N(A) = -1$, where G(s) does not include NL which is therefore shown within brackets in FIG. 3.

When the PID-regulator is to be tuned, the system for determining the measured quantities of amplitude and frequency of the self oscillation is brought into self oscillation in that the nonlinear circuit function NL is introduced into the signal path of the regulator signal, i.e. the error signal e, or more exactly measured values of the input signal e to the regulator said values being established by means of the microcomputer. Thus, the input signal e to the regulator is processed by means of the non-linear circuit function NL. The amplitude and the frequency of the self oscillation are then determined in a suitable manner by measuring on the output signal y.

The measuring of the amplitude and frequency of said oscillation is no part of the invention but any suitable method of measurement can be used. For measuring the amplitude three methods are mentioned:

(1) The amplitude of consecutive oscillations is measured and the amplitude value is accepted when the next amplitude value differs less than a predetermined amount, e.g. 3% of the amplitude;

(2) The method of recursive least squares identification is used;

(3) Kalman filter is used.

The frequency can also be determined in several ways, three being mentioned here:

(1) The simplest procedure is to measure the time between consecutive zero crossings of the oscillation;

(2) The method of recursive least squares can be used;

(3) A so called expanded Kalman filter can be used, which facilitates determination of both amplitude and frequency from the same filter.

The block diagram of FIG. 3 illustrates the operation of the invention. In practise however, the error signal e is generated in the regulator itself and so the fed back signal $-y$ can be supplied to the microprocessor 13 over a further A/D-converter. However, generally a multiplexer is used on the regulator input before the A/D-converter 11. These latter embodiments also facilitate measurements on the output signal y for determining the amplitude and frequency of the self oscillation.

Figure 5:
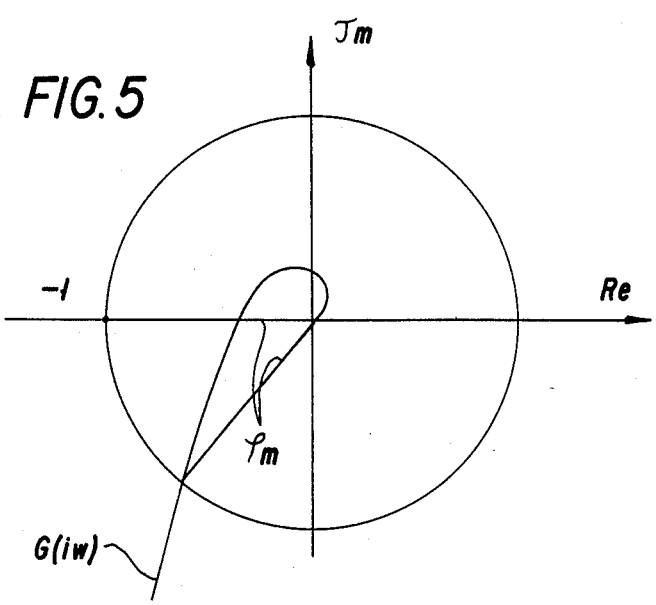
FIG. 5 is a diagram defining the phase margin of a transfer function of a process.

By taking advantage of a non-linear circuit function NL, having a relay characteristic, one application for tuning PID-regulator has been described. According to another application a PID-regulator can be tuned to give a process system a desired phase margin. In FIG. 5 the phase margin $\phi_m$ of a transfer function G(s) is shown. This application is particularly appropriate if the non-linear circuit function has a relay characteristic, preferably an ideal characteristic with hysteresis. A circuit function having an ideal relay characteristic and hysteresis processes an input signal in such a way that the input signal when it decreases below a first value $-H$ results in a low output signal $-d$ and when it increases beyond a second value H, larger than said first value, results in a high output signal $+d$. The output signal always is a square wave signal. The value H is a measure of the hysteresis. It is realized that the amplitude A of the input signal must exceed the hysteresis H for correct operation.

The describing function N'(A) of a circuit function having an ideal relay characteristic and hysteresis is:

$$N'(A) = \frac{4d}{\pi A} \cdot e^{-i\phi}; \quad \phi = \arcsin \frac{H}{A}; \quad A > H$$

where A as before is the amplitude of the input signal of the non-linear circuit, d is the amplitude of the output signal from the non-linear circuit, H is a measure of the hysteresis and 0 is a measure of the time delay between the input and the output. The negative inverse of the describing function can be shown to be:

$$-\frac{1}{N'(A)} = -\frac{\pi}{4d}\sqrt{A^2 - H^2} - i\frac{\pi \cdot H}{4d}$$

Figure 4:
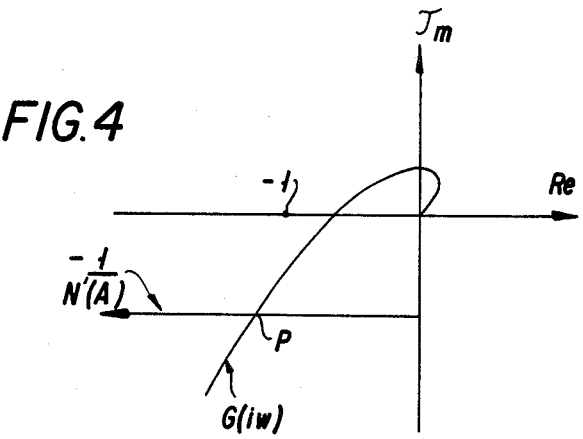
FIG. 4 is a diagram of the same kind as FIG. 2 but in addition to the Nyquist curve of a transfer function also shows the describing function of a circuit function having an ideal relay characteristic and a hysteresis.

Since the imaginary member is independent of the amplitude A the curve of $-1/N'(A)$ in the complex plane becomes a straight line parallel to the negative real axis; cfr. FIG. 4.

In the feed back system of FIGS. 1 and 3 self oscillation will occur if the curves of $G(i\omega)$ and $-1/N'(A)$ cross as shown in FIG. 4. Since the amplitude and frequency of the self oscillation are obtained from the parameters of the curves at the crossing point p, the transfer function $G(i\omega)$ can be determined at the frequency of the self oscillation.

Thus, when a circuit function having a relay characteristic and hysteresis is introduced into the signal path of the PID-regulator self oscillation is caused to occur. By measuring the amplitude and frequency of the self oscillation a desired phase margin of the control system in question can be set. Reference is made to "A PID Tuner based on Phase Margin Specification" by Tore Hägglund, September 1981.

Two embodiments which entail the introduction of a circuit function of ideal relay characteristic have been disclosed for the determination of parameters and the subsequent tuning of a PID-regulator. The method of the invention is simple and can be incorporated as a few program step in a microcomputer. The method can also be performed manually or entirely automatically. The method entails interference into the normal control of a process and therefore is performed intermittently. A program clock can initiate tuning of the PID-regulator at predetermined intervals such as once every twenty-four hours or once a week.

According to a requirement mentioned above for the describing function of the non-linear circuit function NL the input signal of the describing function should be a sine signal. On the other hand the output signal of said describing function is a square wave signal. However, in most cases the transfer function of a process is a low pass filter, with the result that the process output signal y which is fed back to the input of the regulator is filtered and essentially only includes the fundamental frequency, i.e. harmonics are filtered out.

Experiments have shown that processes having a relatively simple or "good" transfer function which normally are controlled by means of a conventional PID-regulator very well comply with the above concept. Since the purpose of the invention is to provide a simple tuning method for use in simple PID-regulators the approximation made is of a small significance.

Figure 6:
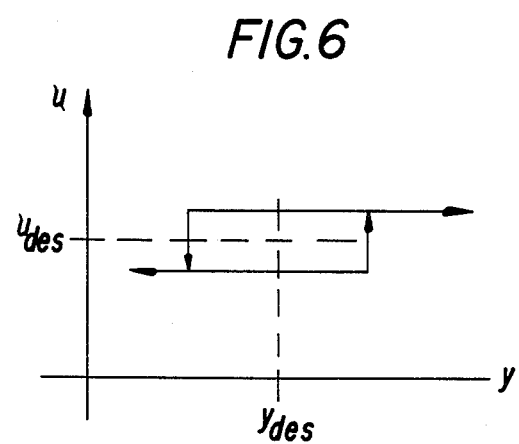
FIG. 6 is a diagram showing the bias of a non-linear circuit function to a predetermined working point.

In reality the describing function of the non-linear circuit function holds also for input signals which differ considerably from the sine shape. However, the input signal must be fairly symmetric. In order to secure symmetry the non-linear circuit function is biased to a suitable working point as shown in FIG. 6. A desired output signal $y_{des}$ corresponds to an input signal $u_{des}$. The input signal $u_{des}$ can be determined as that input signal for which the output signal from the non-linear circuit function with an ideal relay characteristic is symmetric.

In its turn this can be determined by measuring the positive and negative time periods $T_+$ and $T_-$ of the output square wave signal resulting from the non-linear circuit function NL. By means of successive measurements with different input signals $u_{des}$ can be estimated by interpolation. It is appreciated that the parameters of the non-linear circuit function can be chosen in different ways. It can be desirable to fix certain parameters while other parameters are free to be chosen.

The invention is not limited to the embodiments described but can be modified within the scope of the pertaining claims.

We claim:

1. In tuning a regulator (2) of the PID type of process (1) in a feedback system where the process and the regulator have a transfer function G(s) in common, a method of bringing the system into self-oscillation, whereupon the amplitude and the frequency of said self-oscillation are determined and the regulator is tuned in dependence upon the values determined for the amplitude and the frequency of the self-oscillation, characterized in that for achieving said self-oscillation a non-linear circuit function (NL) which has such a describing function N(A) that $G(i\omega) \cdot N(A) = -1$ for at least one value of the angular frequency $\omega$ and the amplitude A of an input signal, is connected in series to the process (1), whereupon the circuit function is removed after the amplitude and the frequency of the self-oscillation have been determined.

2. Method as claimed in claim 1, characterized in that the circuit function (NL) has a relay characteristic.

3. Method as claimed in claim 1, characterized in that the circuit function (NL) has a relay characteristic and hysteresis.

4. In tuning a regulator (2) of the PID type of a process (1) in a feedback system where the regulator and the process have a transfer function G(s) in common, an apparatus which is adapted to bring the system into self-oscillation in order to measure the amplitude and the frequency of the self-oscillation, characterized by a means (7, 8; 13–15) which is adapted to realize a non-linear circuit function (NL) having such a describing function N(A) that $G(i\omega) \cdot N(A) = -1$ for at least one value of the angular frequency $\omega$ and the amplitude A of an input signal, and to temporarily connect said circuit function in series to the process (1).

5. Apparatus as claimed in claim 4, characterized in that the circuit function (NL) has a relay characteristic.

6. Apparatus as claimed in claim 4, characterized in that the circuit function (NL) has a relay characteristic and hysteresis.

7. Apparatus as claimed in claim 4, characterized in that said means comprises an electric circuit (7) and a switch (8) for temporarily connecting the electric circuit to the regulator (2).

8. Apparatus as claimed in claim 4, wherein the regulator (2) comprises a microcomputer in which the control functions of the regulator are realized by means of algorithms, characterized in that said means consists of said microcomputer (13–15), said circuit function (NL) being realized by an algorithm therein.

* * * * *